US007970206B2

(12) United States Patent
Harris et al.

(10) Patent No.: US 7,970,206 B2
(45) Date of Patent: Jun. 28, 2011

(54) METHOD AND SYSTEM FOR DYNAMIC, LUMINANCE-BASED COLOR CONTRASTING IN A REGION OF INTEREST IN A GRAPHIC IMAGE

(75) Inventors: Jerry G. Harris, Newberry, FL (US); Aravind Krishnaswamy, San Jose, CA (US); Scott Byer, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1231 days.

(21) Appl. No.: 11/610,266

(22) Filed: Dec. 13, 2006

(65) Prior Publication Data

US 2008/0143739 A1 Jun. 19, 2008

(51) Int. Cl.
*G06K 9/00* (2006.01)
*G06K 9/34* (2006.01)

(52) U.S. Cl. ........................................ 382/162; 382/173

(58) Field of Classification Search .......... 382/162–165, 382/167, 173, 176, 284, 305; 358/518; 345/611; 715/861
See application file for complete search history.

(56) References Cited

U.S. PATENT DOCUMENTS

| | | | | |
|---|---|---|---|---|
| 6,016,137 | A | 1/2000 | Evans | |
| 6,263,101 | B1 * | 7/2001 | Klein | 382/162 |
| 7,129,959 | B2 | 10/2006 | Someya | |
| 7,298,383 | B2 | 11/2007 | Vuylsteke | |
| 7,519,236 | B2 * | 4/2009 | Cheng et al. | 382/305 |
| 2002/0063740 | A1 | 5/2002 | Forlenza | |
| 2005/0179699 | A1 * | 8/2005 | Someya et al. | 345/611 |

OTHER PUBLICATIONS

International Search Report in application No. PCT/US07/87414 mailed May 5, 2008.

* cited by examiner

*Primary Examiner* — Duy M Dang
(74) *Attorney, Agent, or Firm* — Robert C. Kowert; Meyertons, Hood, Kivlin, Kowert & Goetzel, P.C.

(57) ABSTRACT

Foreground images, such as cursors, may be displayed over an image by selecting individual pixel colors to contrast with surrounding background pixels. The background pixels in, around and behind the foreground image may be converted from a red-green-blue (RGB) color space to a luminance isolating color space, such as YUV, HSL or the like. The converted pixel information may be copied, stored, or drawn into a separate compositing window. After converting to the luminance isolating color space, the luminance values of the pixels may be adjusted to increase the contrast between the foreground image and the background image. Portions of the foreground image may also be blurred, such as by applying a Gaussian or box blur, such as to soften the edges. The pixel information may then be converted back into the RGB color space and blended with the background information using alpha information for the foreground and background images.

40 Claims, 6 Drawing Sheets

METHOD AND SYSTEM FOR DYNAMIC, LUMINANCE-BASED COLOR CONTRASTING IN A REGION OF INTEREST IN A GRAPHIC IMAGE

BACKGROUND

1. Field of the Invention

The present invention is directed to computer systems. More particularly, it is directed to graphical image processing.

2. Description of the Related Art

Traditionally, dynamic foreground image elements, such as cursors or user-defined bounding lines, are drawn using an XOR drawing mode that allows the same drawing function to both draw and erase the foreground image. XOR is a bitwise logical operation on two operands that results in a logical value of true if and only if one of the operands, but not both, has a value of true. The XOR operation is performed over each bit in the operands. Performing the same XOR operation on the same operands twice results in the original operands. Thus, when a cursor is drawn using an XOR mode, that cursor may be erased by drawing the same cursor again in the same location. When drawing foreground images using XOR, a foreground image is typically drawn into the frame buffer and therefore changes the actual background image accordingly. Thus, the background image must be restored whenever the foreground image is to be erased. However, XOR-based cursor drawing frequently causes color shifts that may interfere with the overall look of the image and that may also cause a user difficulty when working with an image, such as in a graphics or image drawing application.

When using XOR drawing, in order to ensure contrast between a foreground image element, such as a cursor, and the background, generally a double edge, one black and one white is used with the XOR drawing so that the edge of the cursor is visible over varying background colors. However, using such a double edge may increase the amount of the background image that is being covered by the foreground image element.

A traditional black-over XOR is performed by XORing all 1s over an image. For example, in an 8-bit deep frame buffer using RGBX representation (alpha in the frame buffer is generally ignored) if the overlay value at a location x,y is set, then pixel x,y is set to pixel x,y XOR 0xFFFFFF00.

AddOver is a variant of XOR that uses 0x80 instead of 0xFF per component. When using AddOver parts that are XORed with 0x80 are guaranteed to always change. AddOver can be thought of as "if (r<½ intensity) r+=half intensity else f−=half intensity." Like XOR, AddOver may generate color shifts and must be performed a second time undo or erase the effects of a first AddOver operation.

SUMMARY

Dynamic foreground images, such as cursors, bounding lines, shapes, and text may be displayed over an image by selecting the actual color values for the individual pixels of the foreground image to have high contrast in comparison to the surrounding background pixels. In order to select high-contrast colors, the background pixels with which the foreground pixels should contrast may first be converted from a non-luminance-isolating color space, such as a red-green-blue (RGB) color space, to a luminance isolating color space, such as YUV, HSL, or the like. In general, graphics hardware systems, such as graphics processors (GPUs) work with pixel color information in the non-luminance-isolating color space. Only pixels around and behind where the foreground image will be displayed may be converted, according to one embodiment. By converting the pixel information into a luminance isolating color space, the luminance or brightness of pixels can be adjusted (thereby adjusting the contrast between the foreground and background pixels) without cause unnecessary color shifts. As noted above, dynamic foreground images, such as cursors, are traditionally drawn using an XOR drawing mode that allows the same drawing function to both draw and erase the foreground image. However, XOR-based cursor drawing frequently causes color shifts that may interfere with the overall look of the image and that may also cause a user difficulty when working with an image, such as in a graphics or image drawing application.

In some embodiments, the converted pixel information is copied, stored, or drawn into a separate compositing or layered window. By using a separate compositing or layered window, the foreground image information may be blended or composited with the background image information and the resultant blending may be displayed, printed, etc., the background image information has not actually be modified and therefore no saving and restoring of background pixel information is required to update the foreground image, such as when a cursor is moving across and image.

After converting the pixel information from the non-luminance-isolating color space, such as RGB, to the luminance isolating color space, the luminance of the pixel information may be adjusted to increase the contrast between the foreground image and the background image. In some embodiments, the luminance values may be adjusted by using modulo arithmetic to add 0.5 to the current luminance value. Please note that by using modulo arithmetic, the resulting new luminance value is guaranteed to be between 0 and 1. In some embodiments, pixel information of portions of the background image may also be blurred, such as by applying a Gaussian or box blur, such as to soften the edges of the foreground image.

The pixel information may then be converted back into the non-luminance-isolating color space, according to some embodiments. The pixel information of the foreground image may then be combined, composited or blended with the background image to display the foreground image. The blending may be performed using alpha information for the foreground and/or background images. Such blending may result in a partially transparent foreground image in some embodiments. Additionally, the alpha blending may result in anti-aliasing edge pixels of the foreground image. Such anti-aliasing may make the final display of the foreground image more pleasing to the eye, such as by removing jagged and/or blocky patterns in the image. Additionally, such anti-aliasing may help minimize the amount of the background image obscured by the foreground image.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
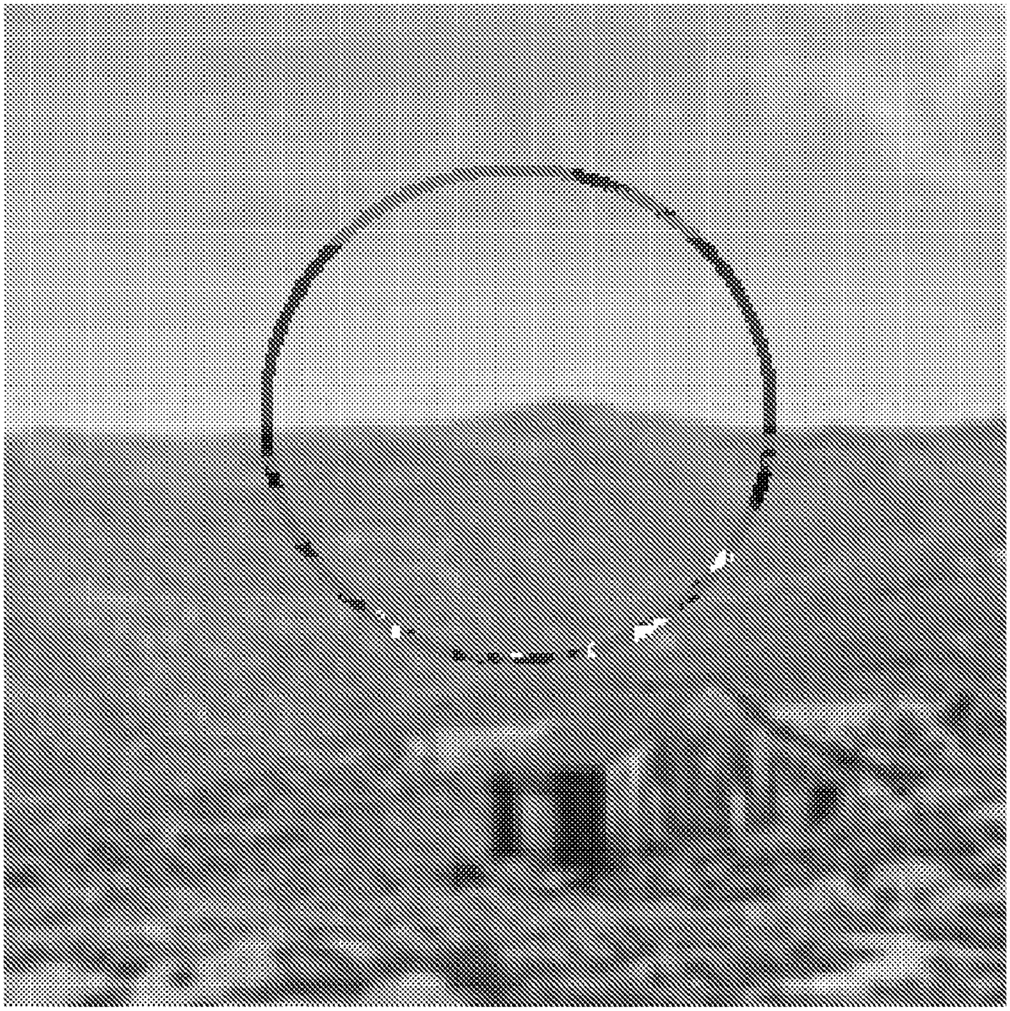
Fig. 1 (prior art)
FIG. 1 is an image illustrating XOR based drawing of a foreground image on top of a background image, according to the prior art.

As described above, traditionally cursors and other dynamic foreground images are drawing using an XOR drawing mode. FIG. 1 is an image illustrating a circle drawn over a landscape background using an XOR drawing mode, according to the prior art. As can be seen in FIG. 1, the XOR drawing may result in color changes or shifts depending upon the exact color of the background and foreground at any particular pixel. While the XOR drawing illustrated in FIG. 1 may result in contrasting colors for the circle, the color changes from one area of the circle to another may cause the overall image to be visually disturbing, not pleasing to the eye, or even wrong. Such color shifts (also called chroma shifts or chroma crawling) may even interfere with a user's perception of the colors in the background image. For example, if a user is adjusting the colors of the background image the cursor used to select pixels of the background image for adjustment may include various colors and color shifts and thus may interfere with the user's color corrections.

Additionally, redrawing the same foreground image in the same location using XOR generally erases a foreground image drawn with XOR. However, if something is drawn to the background at the same location as the foreground image while the foreground image is visible, re-drawing the foreground image will not fully erase the foreground image, but instead alter the background image.

As described above, cursors and other foreground image may be drawn to a separate compositing or layered window, according to some embodiments. Large complex images may be defined using layers. Layers are independent images that can be manipulated as if each layer were an independent image. Each layer only forms a part of the final image. Layers are like transparencies stacked one on top of one another. Each layer may have different objects, images and effects. Layers allow users to work on separate images in order to modify sections without changing the entire image. When the layers are stacked, the images appear as if they are all a single image. The final image will be made up from all of the layers within the image depending on the order of the layers.

When drawing to a separate compositing or layered window, the actual pixel information of the background image in the frame buffer is not actually modified to display the foreground image. Instead, a compositing mechanism provided by a graphics system, GPU, or operating system may be used to composite the foreground image in the layered window with the background image for on-screen display without actually modifying the underlying background pixel information, according to some embodiments. For example, when using a separate compositing or layered window to draw and update an onscreen cursor, the graphic application may dynamically calculate the contents of the window for each new location at which the cursor should be drawn.

Please note that the term "foreground image", as used herein, may refer to virtually any sort of image element being dynamically displayed over a background image, as described herein. For example, in one embodiment, the foreground image may be a cursor moved by a mouse or other input device. In other embodiments, a foreground image may represent a set of lines, curves or other geometric primitives. For example, a graphics program may allow a user to select a particular region of an image by specifying a bounding line (e.g., such as with a rubber-banding, or "lasso" tool) around the region. In yet other embodiments, the foreground image may represent text being displayed over a background image, such as extra information for a user. In general, dynamic, luminance-based color contrasting may be used with virtually any graphic information as a foreground image.

Figure 2:
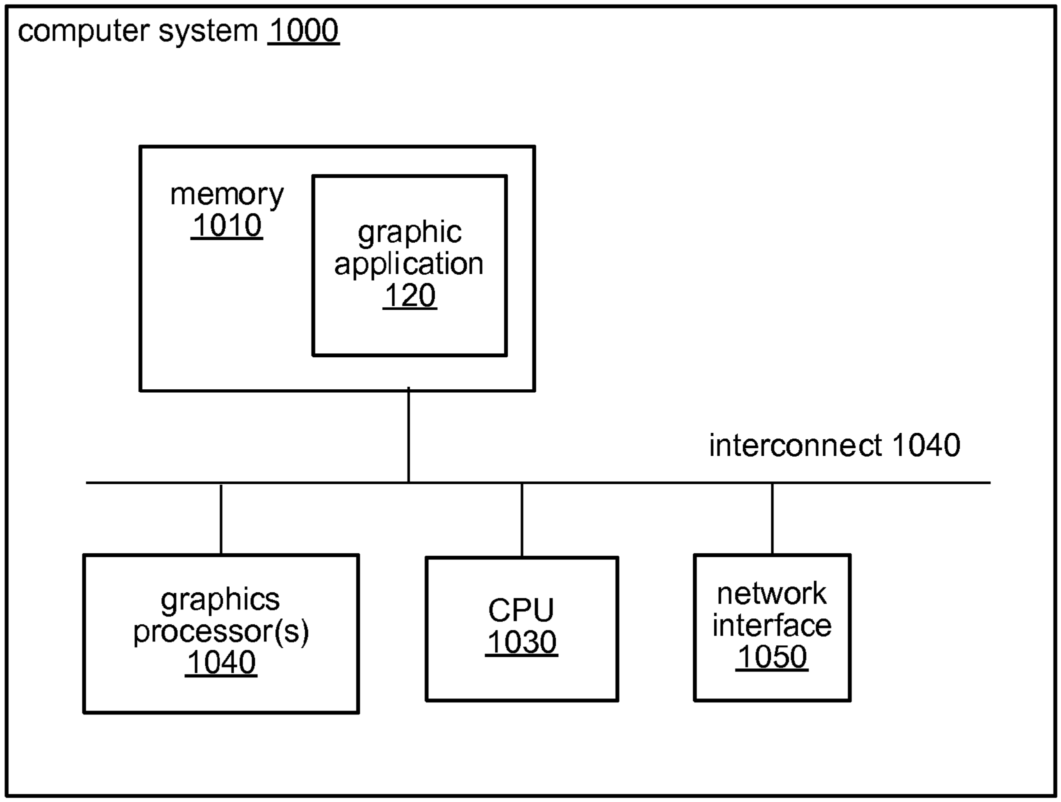
FIG. 2 is block diagram illustrating one embodiment of a computer system capable of implementing dynamically contrasting colors in a region of interest, as described herein.

FIG. 2 is a block diagram illustrating one embodiments of a computer system 1000 suitable for implementing the dynamically contrasting colors using luminance, as described herein. As noted above, a graphics application such as graphics application 120 may be configured to render a foreground image using luminance to determine colors that contrast with the background onto which the foreground image is displayed. Additionally, graphics application 120 may also perform blurring, anti-aliasing and/or blending to display the foreground image, according to some embodiments. Graphics application 120 may also be configured to render the foreground image to a separate compositing or layered window rather than rendering the foreground image directly into the same frame buffer containing the background image.

Graphics application 120 may represent various types of graphics applications, such as painting, publishing, photography, games, animation, and other applications. Additionally, graphics application 120 may utilize a graphics processor 1040 when rendering or displaying foreground images onto background images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them must faster than drawing directly to the screen with a host central processing unit (CPU), such as CPU 1030. Please note that functionality and/or features described herein as being part of, or performed by, graphics application 120 may, in some embodiments, be part of, or performed by, one or more graphics processors, such as graphics processor 1040. As described above, in some embodiments graphics application 120 may be configured to render foreground images into a separate image layer or separate layered window.

Figure 3A:
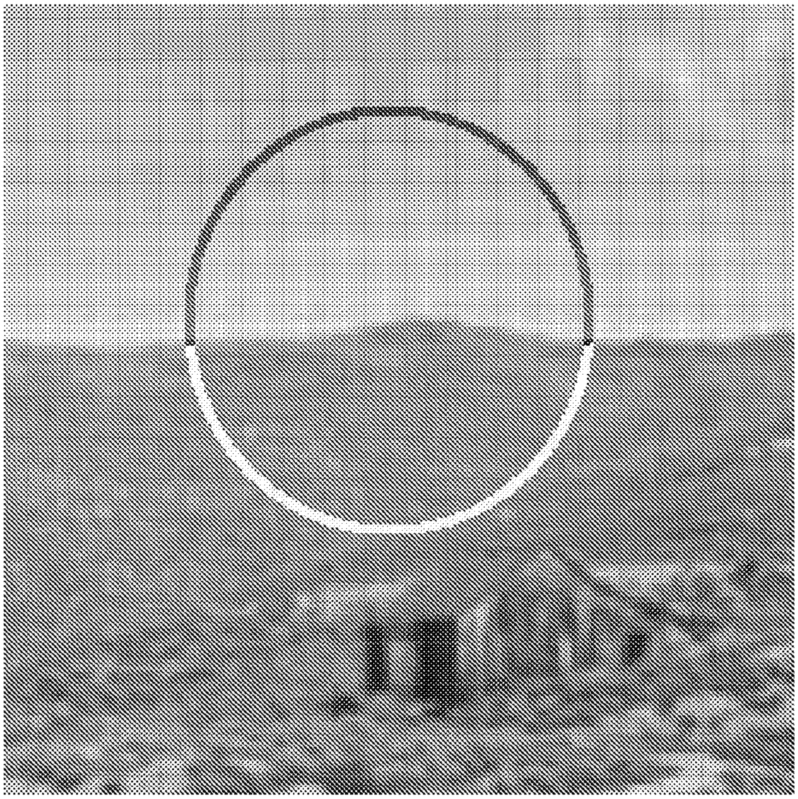
FIGS. 3A-3F are images illustrating dynamic luminance-based contrasting of colors, according to one embodiment.
Figure 3B:
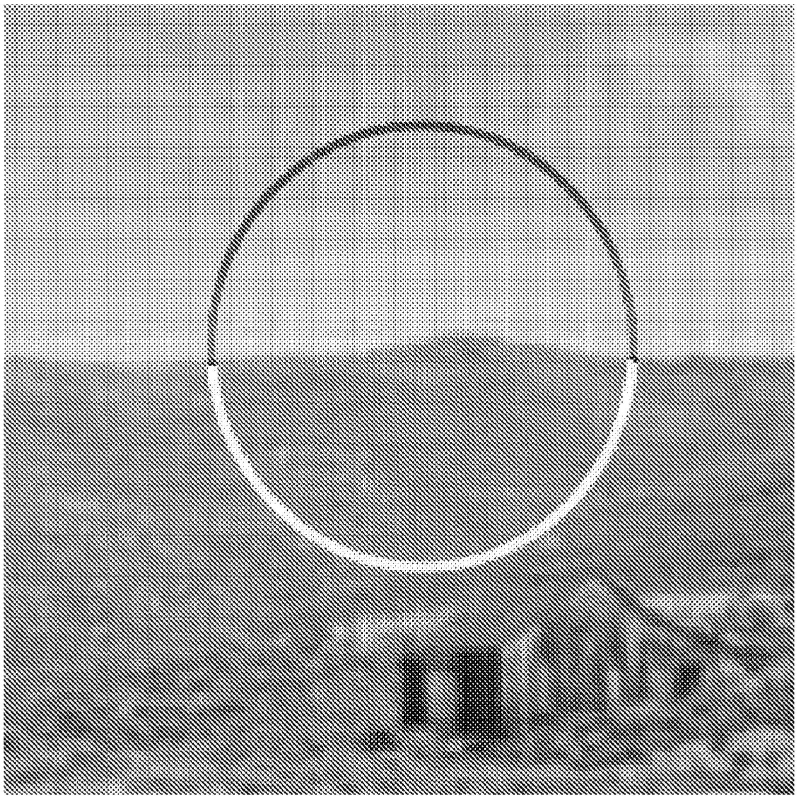

FIGS. 3A and 3B illustrate versions of an image including a foreground image (the circle) over a background image, according to some embodiments. As described above, graphics application 120 may be configured to draw a foreground image, such as the circle illustrated in FIGS. 3A and 3B, over the background image using luminance-based contrast, as described herein. For instance, graphics application 120 may first convert the pixel information of that region of the background image to be covered by the foreground image from an non-luminance-isolating color space to a luminance isolating color space. Please note that graphics systems and graphics processors generally work on RGB pixel information. Thus, in some embodiments, pixel information may be converted from an RGB color space to a luminance isolating color space, manipulated (e.g. increased contrast, blurred, anti-aliased, etc.), then converted back into the RGB color space before being displayed. Please note that in some embodiments, graphics application 120 may perform some manipulations on the foreground image after it has been converted back to the RGB color space. Please note that while described herein as converting from RGB to YUV, dynamic, luminance-based color contrasting may in general include converting pixel information from any non-luminance-isolating color space to any luminance-isolating color space, according to some embodiments.

When converting pixel information from the RGB color space to a luminance isolating color space, graphics application 120 may first determine which pixels of the background to convert according to a mask of the foreground image. Such a mask may indicate the shape of the foreground image. Thus, graphics application 120 may use such a mask and the location where the foreground image is to be displayed to determine which pixels of the background image to use. Graphic application 120 may then convert the pixel information from RGB color space to a luminance isolating color space, such as the YUV color space.

The YUV model may define a color space in terms of one luminance and two chrominance components. The YUV color space may model human perception of color more closely than the standard RBG model generally used in computer graphics hardware. In the YUV color space, Y stands for the luminance component or the brightness, while U and V are the chrominance, or color, components. When converting a pixel from RGB to YUV, weighted values of the R, G, and B components are added together to produce a single Y component, representing the overall brightness, or luminance, of that pixel. The U component may be created by subtracting the Y from the original blue component of the pixel and scaling by some factor. The V component may be generated by subtracting the Y from the original R component and then scaling by a different factor. There are various formula for converting between RGB and YUV and for converting between RGB and other luminance isolating color spaces. While any of various luminance isolating color spaces may be used by graphics application 120, in one embodiment, graphics application 120 may use a color space (such as YUV) that requires only a simple matrix multiplication to convert to and from RGB. Please note that while described herein regarding YUV color space, luminance-based contrasting may be performed using any of various luminance isolating color spaces.

The following set of formulas represent one possible way to convert a pixel's color information from RGB to YUV, according to some embodiments:

$$Y=+R*0.299+G*0.587+B*0.114$$

$$U=-R*0.147-G*0.289+B*0.436$$

$$V=+R*0.615-G*0.515-G*0.100$$

Please note that after the conversion from RGB to YUV, the pixel information still represents the same color information, just using different components. After converting the pixel information from the RGB color space to YUV color space (or some other luminance isolating color space), graphics application 120 may be configured to modify the luminance values for the pixels to increase the contrast with the surrounding background images. As illustrated in FIGS. 3A and 3B, the pixels of the foreground image (the circle) have been adjusted to contrast with the surrounding background pixels. Furthermore, since the contrast is created by adjusting the luminance or brightness of the pixels, the resulting pixels are still of similar color to the original background pixels, just of a different brightness. In other words, the portion of the foreground circle shown in FIG. 3A that is above the horizon is blue—like the background above the horizon, but of a different shade or brightness of blue. Similarly, the portion of the foreground circle shown below the horizon is not blue, but is white or light grey in contrast the to darker grey of the background. When compared to the circle in prior art FIG. 1, the circles in FIGS. 3A and 3B do not have the jarring color shifts resulting from the traditional XOR drawing illustrated in FIG. 1.

The amount by which the luminance of a pixel is adjusted may vary from embodiment to embodiment. In one embodiment, 0.5 is added to the luminance component using modulo arithmetic so that the resulting value will remain between 0 and 1. For example, if a pixel, after being converted to YUV color space, has a luminance (Y) component of 0.8, graphics application 120 may, in one embodiment, add 0.5 to 0.8 using modulo arithmetic resulting in a new luminance value of 0.3. In other words, 0.5 added to 0.8 results in 1.3 that is then truncated by modulo arithmetic to contain only the fractional part of the result (i.e., 0.3). In other embodiments, other method for adjusting the luminance component of a pixel may be used. For instance, in one embodiment, the luminance value for a pixel may be set to either 0.0 or 1.0 depending on whether the pixel's original luminance value is less than or greater than a specified value. For example, the luminance value for a pixel may be set to 0.0 if the original luminance value is less than a "perceptual gray" value, such as 0.5 and if the pixel's luminance value is greater than the 0.5 perceptual gray, the pixel's luminance value may be set to 1.0, according to one embodiment. Additionally, other specified values may be used other than 0.5. For example, in some display systems, 0.5 may not represent a perceptual gray and therefore a value that does represent a perceptual gray may be used.

As noted above, the actual amount by which the luminance component is adjusted may vary from embodiment to embodiment. In some embodiments, the actual amount by which the luminance value is adjusted may be selected so as to ensure that there is a noticeable difference in luminance between the foreground image and the background image, as illustrated in FIG. 3A.

In some embodiments, the amount by which the luminance of a pixel is adjusted by vary as the foreground image is displayed different times. For example, graphics application 120 may be configured to animate a cursor as it is moved around the image by varying the amount by which the luminance is adjusted, according to one embodiment. In another embodiments, a foreground image may be animated by changing its luminance over a short period of time, such as to make a cursor or other foreground image stand out better against the background. In yet other embodiments, graphics application 120 may animate a cursor whenever the user has not moved the cursor for a specified amount of time, such as a few seconds.

Figure 3C:
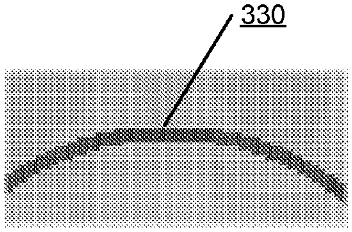
Figure 3D:
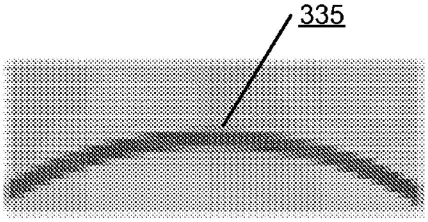

FIG. 3A illustrates a foreground circle drawn using luminance-based contrasting, as described above. In addition to adjusting the luminance to generate contrast, graphics application 120 may also be configured to further manipulate the pixel information of the foreground image to further enhance the final, resulting image. For instance, as noted above, graphics application 120 may also blur and or anti-alias portions of the image, as illustrated in FIG. 3B. FIGS. 3C and 3D illustrate enlarged views of a portion of the image in FIGS. 3A and 3B, respectively. A comparison of location 330 in FIG. 3C and location 335 in FIG. 3D illustrates the effect of blurring the image. Graphics application 120 may be configured to blur those portions of the background image that are near an edge of foreground image, as illustrated at location 335 in FIG. 3D. Thus, in some embodiments, graphics application 120 may convert portions of the background image near, not just directly under, the location of the foreground image to YUV.

In some embodiments, graphics application 120 may be configured to apply a Gaussian blur to portions of the image, while in other embodiments other type of blurring may be used. For example, a box blur may be utilized in some embodiments. A box blur is an image filter in which each pixel in the resulting image has a value equal to the average value of its neighboring pixels in the input image. It is a form of low-pass ("blurring") filter and is a convolution. Due to its property of using equal weights it can be implemented using a much simpler accumulation algorithm that is significantly faster than using a sliding window algorithm. Box blurs are frequently used to approximate a Gaussian blur. If applied 3 times on the same image it approximates the Gaussian kernel to within about 3%, error yielding the same result as a quadratic convolution kernel.

Graphics application 120 may be configured to blur different areas of an image, according to various embodiments. For example, in one embodiment, graphics application 120 may blur the background pixel values prior to converting them to YUV, such as to reduce the effect of noise in the background image on the foreground image or to reduce the positional sensitivity of the item. In another embodiment, graphics application 120 may blur the adjusted luminance values before converting them back to RGB, such as to generate a more pleasing transition within the foreground image while retaining sharp edges.

In some embodiments, graphics application 120 may blur portions of the image more than once. For example, in one embodiment, graphics application 120 may be configured to first blur background pixel values prior to converting them from RGB to YUV and again after the luminance adjustment to soften any hard transitions created by the adjustment. Adjusting the luminance values may introduce hard or harsh transitions between pixels, such as when one pixel's luminance value ends up high (e.g., 0.8) while a neighboring pixel's luminance value ends up low (e.g., 0.2).

Please note graphics application 120 may not actually update the background image, but instead may first copy pixel values from portions of the background image at and around the location at which the foreground image will be displayed to a separate compositing window and blur those pixel values. In general, graphics application 120 may blur various portions of the image before or after converting pixel values to YUV. In some embodiment, blurring may be performed at various stages of generating the foreground image but generally prior to masking out the foreground image so as to ensure that the blurring does not obliterate the edge of the foreground image.

In yet another embodiment, graphics application 120 may be configured to blur the foreground image by scaling, such as via interpolation, a lower resolution version of the same image. In general any method of blurring portions of the foreground image may be utilized by graphics application 120, according to various embodiments. Please note however that in some embodiments, dynamic luminance-based color contrasting may be performed without any blurring at all.

Figure 3E:
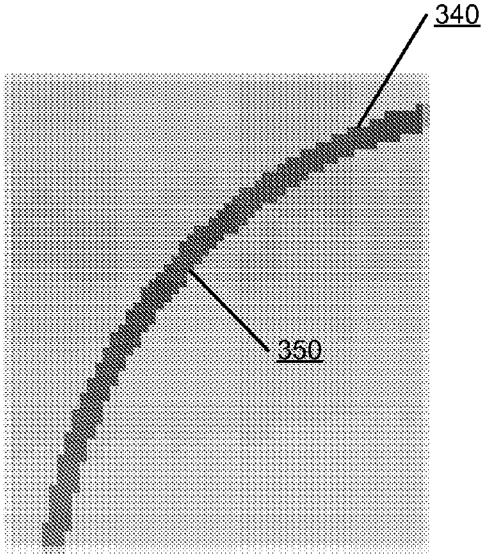
Figure 3F:
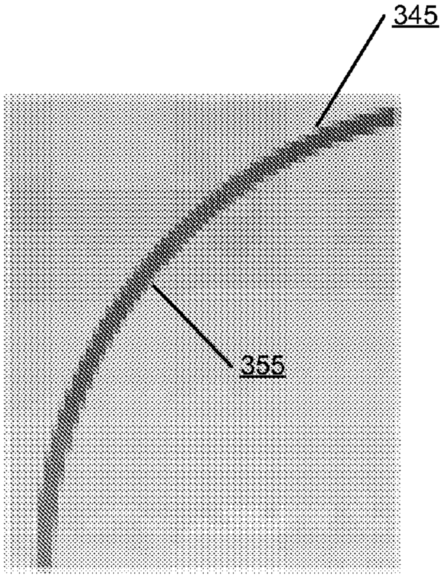

Additionally, as illustrated by FIGS. 3E and 3F, graphics application 120 may be configured to anti-alias the edges of the foreground image, such as to create a soft transition between the foreground and background portions of the overall image. Anti-aliasing is frequently described as a technique for minimizing jagged or blocky patterns (called aliasing) in an image. While in some embodiments, only pixels that are part of the foreground image may be anti-aliased, in other embodiments, pixels of both the foreground and background images may be anti-aliased. For example, an anti-aliased line may be a line with varying opacity along the edge in order to represent partial coverage of underlying pixels. As will be discussed in more detail below, graphics application 120 may be configured to smooth or anti-alias pixels at the edges of the foreground image. In one embodiment, the anti-aliasing may be performed at the same time as blending or compositing the final foreground image with the background. Thus, in some embodiments, graphics application 120 may be configured to convert the foreground image back into RGB color space and then blend the foreground image with the background—including anti-aliasing the edges.

In some embodiments, graphics application 120 may be configured to not convert the pixel information back to RGB color space. Instead, graphics application 120 may be configured to use the new luminance value for each of the red, green and blue color components and therefore have a grayscale foreground image, such as a grayscale cursor. In other words, if the new luminance or brightness values for a pixel of the foreground image is used for the red, green and blue color values, the resulting pixel would have red, green and blue color components of equal value, hence a value of gray. In some embodiments a grayscale foreground image may still be blended with the background, including anti-aliasing.

Any of various formulae may be used to convert the pixel information back to RGB color space. For instance, the following formulae illustrate one method for converting YUV pixel information to RGB pixel information, according to one embodiment.

$$R=Y+1.140*V$$

$$G=Y-0.395*U-0.581*V$$

$$B=Y+2.032*U$$

After converting the foreground image back into RGB color space, the contents of the compositing window may be blended with the background image to display the full, final image.

Figure 4A:
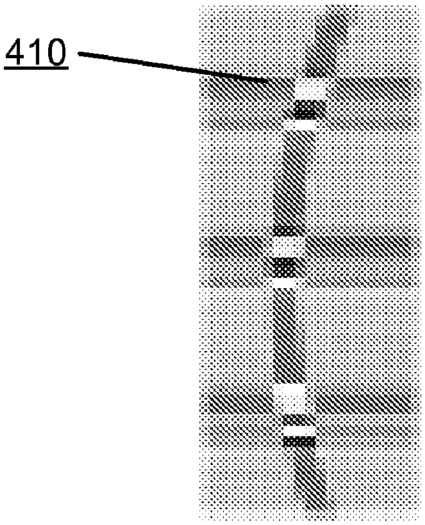
FIGS. 4A and 4B are images illustrating the drawing of temporary foreground images including anti-aliasing and blurring, as described herein, according to one embodiment.
Figure 4B:
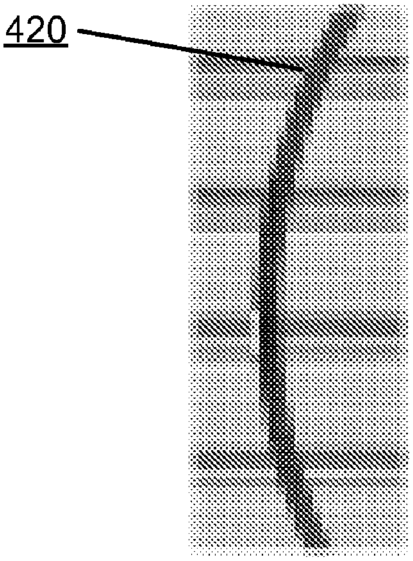

FIGS. 4A and 4B illustrate enlarged detail images of a foreground circle drawn over a varying grayscale background, according to one embodiment. In FIGS. 4A and 4B, a portion of foreground circle is illustrated over a striped grayscale background. FIG. 4A illustrates luminance-based contrasting, as described herein, but without any blurring of the image. In contrast, FIG. 4B illustrates the same circle but with blurring. Comparing location 410 of FIG. 4A with location 420 of FIG. 4B, the effect of blurring the foreground image is illustrated, according to one embodiment. As described above, the luminance values of the background image may be adjusted in the foreground image for contrast, as illustrated at location 410. Where the foreground circle crosses the darker background stripes, the foreground pixels have been adjusted to have luminance values noticeably different from the luminance value of nearby background pixels.

Thus, the foreground circle includes stripes that coincide with, but of different luminance value than, the stripes in the background.

In contrast to FIG. 4A, the foreground image in FIG. 4B has been blurred to smooth out the color changes caused by the luminance-based contrasting, according to one embodiment. Thus, at location 420, the foreground image has been blurred to remove the stripes illustrated in FIG. 4A. While, after blurring, some pixels may not contrast as heavily against nearby background pixels as they did before blurring, blurring may resulting a more eye-pleasing overall image, according to some embodiments. For example, after blurring the foreground image, such as a cursor, may not be as visually distracting as a non-blurred version of the same foreground image, as illustrated by FIGS. 4A and 4B. Additionally, both FIGS. 4A and 4B illustrate anti-aliasing performed on the edges of the foreground circle, as described above.

Figure 5:
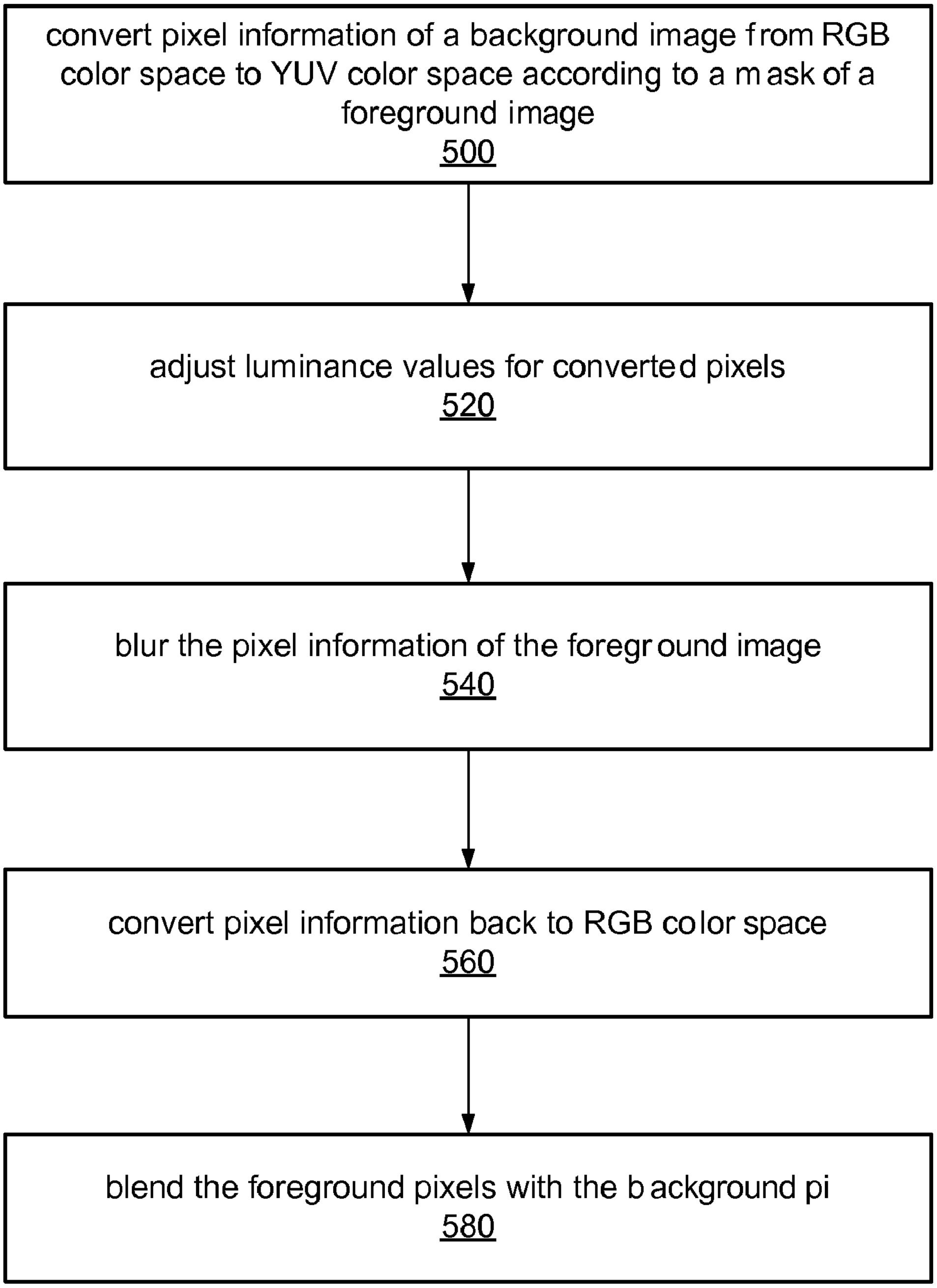
FIG. 5 is a flowchart illustrating one embodiment of a method for dynamic, luminance-based contrasting of colors, as described herein.

FIG. 5 is a flowchart illustrating one embodiment of a method for dynamic, luminance-based contrasting of colors, as described herein. As described above, graphics application 120 may be configured to display a dynamic foreground image, such as a cursor, a bounding rectangle around a user-selected region, floating text, or other dynamic foreground image elements. For example, graphics application 120 may include functionality allowing a user to create and/or manipulate images. Frequently graphics applications allow the user to select or indicate regions of an image using dynamic foreground elements, such as by using a "rubber-banding" tool to draw a boundary line around a selected region of the image. According to some embodiments, graphics application 120 may be configured to use various techniques, such as luminance-based color contrasting, blurring, blending and/or anti-aliasing, when generating and displaying the foreground image (e.g., a cursor, bounding rectangle, or rubber-banding line).

As illustrated by block 500, graphics application 120 may be configured to convert pixel information of a background image from RGB color space to YUV (or another luminance isolating color space) according to a mask of a foreground image, according to one embodiment. Thus, graphics application 120 may use a mask defining the shape of the foreground image to determine which pixels to convert to YUV color space. Thus, graphics application 120 may convert those pixels under and around where the foreground image will be displayed to YUV color space. Please note that in some embodiments, graphics application 120 may blur portions of the image prior to performing the RGB to YUV conversion, as described above.

Once the pixel information is in YUV color space, graphics application 120 may adjust the luminance values for the converted pixels, as illustrated by block 520, to generate contrast between the pixels of the foreground image and nearby or surrounding background pixels. Please note that graphics application 120 is generating the color information for the foreground image by adjusting the luminance value of the background pixel at the same location. Thus, as illustrated in FIGS. 3A and 3B, discussed above, the colors of the foreground image may be in the same hue as the background pixels below, but with a different luminance or brightness.

As described above, graphics application 120 may adjust the luminance by adding a scalar or offset, using modulo arithmetic, to the current luminance value of a pixel. Due to the use of modulo arithmetic, some pixels may end up brighter than they were and others may end up darker. For instance, graphics application 120 may, in one embodiment, add, using modulo arithmetic, 0.5 to the current luminance value of pixels. Therefore a pixel with a current luminance value of 0.4 would end up with a brighter luminance value of 0.9, while a pixel with a current luminance value of 0.8 would end up with a darker luminance value of 0.3. Please note that in other embodiments, graphics application 120 may be configured to adjust luminance values in other manners.

Graphics application 120 may also be configured to blur the pixel information of the foreground image, as indicated by block 540. As noted above, any of various types of blurring functions or filters may be used by graphics application 120, according to different embodiments. For example, in one embodiment graphics application 120 may apply a Gaussian blur to the foreground image pixels. In another embodiment, graphics application 120 may apply a box blur one or more times to the foreground image pixels. In yet another embodiment, a lower resolution version of the same foreground image may be scaled and/or interpolated in order to blur the pixels. As noted above, graphics application 120 may blur both before converting the pixel values to YUV and after adjusting the luminance values, according to some embodiments. In other embodiments, graphics application 120 may be configured to blur pixels only prior to converting the pixel to YUV. Additionally, in some embodiments, graphics application 120 may not perform any blurring at all.

In some embodiments, graphics application 120 may be configured to convert the pixels back to the RGB color space, as described above. For example, graphics application 120 may be configured to utilize a graphics processor, such as GPU 1040, which performs various graphics techniques using RGB color space. Therefore, in some embodiments, graphics application 120 may convert the luminance adjusted and blurred pixels back to RGB space in order to blend the foreground pixels with the background pixels, as illustrated by block 580. When blending the foreground pixels with the background pixels, graphics application 120 may be configured to use alpha or opacity information for the pixels of the foreground and background images for the blending. For instance, as noted above, alpha information for a pixel may represent the relative opacity (or transparency) of the pixel compared to other pixels.

When blending two pixels, graphics application 120 may be configured to take into account the respective alpha values for each pixel when determining how much color from each source pixel contributes to the color of the resulting pixel. For example, if the alpha values for the foreground pixels are 0.5, indicating half opacity, portions of the background image may be visible though the foreground image. Conversely, if the alpha values for the foreground pixels are 1.0, indicating full opacity, the foreground pixels may completely replace the background pixels during blending. Graphics application 120 may utilize the alpha information for various effects in the final image. For example, in one embodiment, the inner part of a cursor may be solid while the edges get progressively transparent. In another embodiments, the inner portion of a cursor may be transparent while the edges may be opaque. Additionally, different foreground images may be blended onto the background using different levels of alpha. For instance, an application that allows multiple people to collaborate across the Internet may, in one embodiment, display different people's cursors using different alpha values. For example, the cursor of the collaboration leader may be displayed more opaquely than others. Alternatively, each person's computer may display the local cursor opaquely, but display the other collaborators'cursors more transparently, according to various embodiments.

When blending the foreground pixels with the background pixels, graphics application 120 may be configured to utilize a pixel shader, such as may be implemented on GPU 1040 to perform the blending. As noted above, a graphics processing unit or GPU, such as GPU 1040, is a dedicated graphics-rendering device for a personal computer, workstation or game console. Modern GPUs may be very efficient at manipulating and displaying computer graphics and their highly parallel structure may make them more effective than typical central processing units (CPUs) for a range of complex graphical algorithms. For example, a GPU may implement a number of graphics primitive operations in a way that makes executing them must faster than drawing directly to the screen with the host CPU. Many GPUs have programmable shading as part of their capabilities. For example, each pixel may be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices and textures with many of the same operations supported by CPUs, oversampling and interpolation techniques to reduce aliasing, and very high-precision color spaces. The following OpenGL pseudo code represents one possible implementation of a pixel shader program for performing the method described above regarding FIG. 5:

```
Uniform sampler2D SourceImage;
Uniform sampler2D CursorTexture;
Uniform float normalizedCursorX;
Uniform float normalizedCursorY;
void main(void)
{
  vec4 yuvcolor;
  vec4 outcolor;
  vec2 cursorTextureOffset = gl_TexCoord[0].st –
  vec2(normalizedCursorX,normalizedCursorY);
  vec4 inColor = texture2D(SourceImage, gl_TexCoord[0].st);
  float cursorAlpha = texture2D(CursorTexture,
  cursorTextureOffset).r;
  // soften the image with a simple blur
  vec4 inColorTop = texture2D(SourceImage,
  gl_TexCoord[0].st+ vec2(0,–1)));
  vec4 inColorLeft = texture2D(SourceImage,
  gl_TexCoord[0].st+ vec2(–1,0));
  vec4 inColorRight = texture2D(SourceImage,
  gl_TexCoord[0].st + vec2(1,0));
  vec4 inColorBottom = texture2D(SourceImage,
  gl_TexCoord[0].st+ vec2(0,1));
  vec4 blurColor = .125 * (inColor*4.0 + inColorTop +
    inColorLeft + inColorRight + inColorBottom);
  // Convert image to YUV
  yuvcolor.r = blurColor .r * 0.299 + blurColor .g * 0.587 +
  blurColor .b * 0.114;
  yuvcolor.g = – blurColor .r * 0.147 – blurColor .g * 0.289 +
  blurColor .b * 0.436;
  yuvcolor.b = blurColor .r * 0.615 – blurColor .g * 0.515 –
  blurColor .b* 0.100;
  // Roll intensity for contrasting visibility
  yuvcolor.5 r += 0.5;
  if (yuvcolor.r > 1.0) yuvcolor.r –= 1.0;
  // Back to RGB
  outcolor.r = yuvcolor.r + 1.140 * yuvcolor.b;
  outcolor.g = yuvcolor.r – 0.395 * yuvcolor.g – 0.581 *
  yuvcolor.b;
  outcolor.b = yuvcolor.r + 2.032 & yuvcolor.g;
  // use cursor alpha to select visility and anti-aliasing
  gl_FragColor = mix(incolor, outcolor, cursorAlpha);
}
```

While in some embodiments, as described above, graphics application 120 may convert the pixels back to RGB color space, in other embodiments, graphics application 120 may be configured to use the new luminance values for the pixels as the RGB values of the pixels for blending purposes. Thus, in some embodiments, graphics application 120 may blend the foreground image with the background image using the adjusted luminance value of a pixel as the red, green and blue color components for that pixel, resulting in a grayscale foreground image.

Luminance-based color contrasting, as described herein may be implemented on various types of computer systems. Referring again to FIG. 2, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 120 described herein may be provided as a computer program product, or software, that may include a computer-readable storage medium having stored thereon instructions, which may be used to program a computer system (or other electronic devices) to implement luminance-based color contrasting, as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 120.

In some embodiments, memory 1010 may include program instructions configured to implement graphics application 120, as described herein. Graphics application 120 may be implemented in any of various programming languages or methods. For example, in one embodiment, graphics application 120 may be JAVA based, while in another embodiments, it may be implemented using the C or C++ programming languages. In other embodiments, graphics application 120 may be implemented using specific graphic languages specifically for developing programs executed by specialize graphics hardware, such as GPU 1040. In addition, graphics application 120 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 2, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 2.

While graphics application 100 has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:

performing by a computer:

determining a plurality of pixels of a background image according to a mask of a foreground image, wherein each background image pixel comprises a value in a non-luminance-isolating color space;

for each of the plurality of pixels of the background image, converting the value in the non-luminance-isolating color space into a corresponding value in a luminance-isolating color space, wherein the value in the luminance-isolating color space comprises a luminance component;

for each of the plurality of pixels of the background image, modifying the value in the luminance-isolating color space by altering the luminance component to create contrast between the foreground image pixels of the background image that surround the plurality of pixels of the background image;

blurring at least some pixels that correspond to the plurality of pixels of the background image, wherein said blurring comprises adjusting pixel values of the some pixels that correspond to the plurality of pixels of the background image relative to pixel values for one or more adjacent pixels;

for each of the plurality of pixels of the background image, converting the modified value in the luminance-isolating color space into a new value in the non-luminance-isolating color space; and blending the foreground image with the background image based on said blurring and on the new values.

2. The method of claim 1, wherein said blurring comprises performing a Gaussian blur.

3. The method of claim 1, wherein said blurring comprises performing a box blur at least once.

4. The method of claim 1, wherein the luminance isolating color space is one of: YUV color space, hue-saturation-lightness (HSL) color space, and hue-saturation-value (HSV) color space.

5. The method of claim 1, wherein the non-luminance-isolating color space is RGB color space.

6. The method of claim 1, wherein said blending is further based on alpha information for the foreground image.

7. The method of claim 1, wherein the foreground image represents a cursor image.

8. The method of claim 1, wherein the foreground image represents an outline of a user-selected region of the background image.

9. The method of claim 1, wherein the foreground image represents text.

10. The method of claim 1, wherein the foreground image represents a path specified by one or more lines and/or curves.

11. The method of claim 1, wherein said converting the value in the non-luminance-isolating color space into the corresponding value in the luminance-isolating color space further comprises storing the corresponding value to a compositing window of a graphics processing system, wherein said modifying, said blurring, said converting the modified value and said blending are performed on data stored in the compositing window.

12. The method of claim 1, wherein said modifying is performed repeatedly over time to vary the contrast between the plurality of pixels of the background image and the other pixels of the background image that surround the plurality of pixels of the background image.

13. The method of claim 1, wherein said converting the value in the non-luminance-isolating color space into the corresponding value in the luminance-isolating color space, said modifying, said blurring, said converting the modified value and said blending are performed by a pixel shader program executing on a graphics processor (GPU).

14. The method of claim 1, wherein said blurring further comprises anti-aliasing one or more edge pixels that correspond to the plurality of pixels of the background image, wherein the one or more edge pixels are within a specified pixel distance of pixels corresponding to an edge of the foreground image.

15. A system, comprising:

a processor; and a memory coupled to the processor, wherein the memory comprises program instructions executable by the processor to perform:

determining a plurality of pixels of a background image according to a mask of a foreground image, wherein each background image pixel comprises a value in a non-luminance-isolating color space;

for each of the plurality of pixels of the background image, converting the value in the non-luminance-isolating color space into a corresponding value in a luminance-isolating color space, wherein the value in the luminance-isolating color space comprises a luminance component;

for each of the plurality of pixels of the background image, modifying the value in the luminance-isolating color space by altering the luminance component to create contrast between the foreground image pixels of the background image that surround the plurality of pixels of the background image;

blurring at least some pixels that correspond to the plurality of pixels of the background image, wherein said blurring comprises adjusting pixel values of the some pixels that correspond to the plurality of pixels of the background image relative to pixel values for one or more adjacent pixels;

for each of the plurality of pixels of the background image, converting the modified value in the luminance-isolating color space into a new value in the non-luminance-isolating color space; and blending the foreground image with the background image based on said blurring and on the new values.

16. The system of claim 15, wherein said blurring comprises performing a Gaussian blur.

17. The system of claim 15, wherein said blurring comprises performing a box blur at least once.

18. The system of claim 15, wherein the luminance isolating color space is one of: YUV color space, hue-saturation-lightness (HSL) color space, and hue-saturation-value (HSV) color space.

19. The system of claim 15, wherein the non-luminance-isolating color space is RGB color space.

20. The system of claim 15, wherein said blending is further based on alpha information for the foreground image.

21. The system of claim 15, wherein the foreground image represents a cursor image.

22. The system of claim 15, wherein the foreground image represents an outline of a user-selected region of the background image.

23. The system of claim 15, wherein the foreground image represents text.

24. The system of claim 15, wherein the foreground image represents a path specified by one or more lines and/or curves.

25. The system of claim 15, wherein said converting the value in the non-luminance-isolating color space into the corresponding value in the luminance-isolating color space further comprises storing the corresponding value to a compositing window of a graphics processing system, wherein said modifying, said blurring, said converting the modified value and said blending are performed on data stored in the compositing window.

26. The system of claim 15, wherein the program instructions are further executable to perform said modifying repeatedly over time to vary the contrast between the plurality of pixels of the background image and the other pixels of the background image that surround the plurality of pixels of the background image.

27. The system of claim 15, wherein said converting the value in the non-luminance-isolating color space into the corresponding value in the luminance-isolating color space, said modifying, said blurring, said converting the modified value and said blending are performed by a pixel shader program executing on a graphics processor (GPU).

28. The system of claim 15, wherein said blurring further comprises anti-aliasing one or more edge pixels that correspond to the plurality of pixels of the background image, wherein the one or more edge pixels are within a specified pixel distance of pixels corresponding to an edge of the foreground image.

29. A non-transitory computer-readable storage medium, comprising program instructions computer-executable to implement:

determining a plurality of pixels of a background image according to a mask of a foreground image, wherein each background image pixel comprises a value in a non-luminance-isolating color space;

for each of the plurality of pixels of the background image, converting the value in the non-luminance-isolating color space into a corresponding value in a luminance-isolating color space, wherein the value in the luminance-isolating color space comprises a luminance component;

for each of the plurality of pixels of the background image, modifying the value in the luminance-isolating color space by altering the luminance component to create contrast between the foreground image and pixels of the background image that surround the plurality of pixels of the background image;

blurring at least some pixels that correspond to the plurality of pixels of the background image, wherein said blurring comprises adjusting pixel values of the some pixels that correspond to the plurality of pixels of the background image relative to pixel values for one or more adjacent pixels;

for each of the plurality of pixels of the background image, converting the modified value in the luminance-isolating color space into a new value in the non-luminance-isolating color space; and blending the foreground image with the background image based on said blurring and on the new values.

30. The non-transitory computer-readable storage medium of claim 29, wherein said blurring comprises performing a Gaussian blur.

31. The non-transitory computer-readable storage medium of claim 29, wherein said blurring comprises performing a box blur at least once.

32. The non-transitory computer-readable storage medium of claim 29, wherein the luminance isolating color space is one of: YUV color space, hue-saturation-lightness (HSL) color space, and hue-saturation-value (HSV) color space.

33. The non-transitory computer-readable storage medium of claim 29, wherein the foreground image represents a cursor image.

34. The non-transitory computer-readable storage medium of claim 29, wherein the foreground image represents an outline of a user-selected region of the background image.

35. The non-transitory computer-readable storage medium of claim 29, wherein the foreground image represents text.

36. The non-transitory computer-readable storage medium of claim 29, wherein the foreground image represents a path specified by one or more lines or curves.

37. The non-transitory computer-readable storage medium of claim 29, wherein said converting the value in the non-luminance-isolating color space into the corresponding value in the luminance-isolating color space further comprises storing the corresponding value to a compositing window of a graphics processing system, wherein said modifying, said blurring, said converting the modified value and said blending are performed on data stored in the compositing window.

38. The non-transitory computer-readable storage medium of claim 29, wherein the program instructions are further configured to perform said modifying repeatedly over time to vary the contrast between the plurality of pixels of the background image and the other pixels of the background image that surround the plurality of pixels of the background image.

39. The non-transitory computer-readable storage medium of claim 29, wherein said converting the value in the non-luminance-isolating color space into the corresponding value in the luminance-isolating color space, said modifying, said blurring, said converting the modified value and said blending are performed by a pixel shader program executing on a graphics processor (GPU).

40. The non-transitory computer-readable storage medium of claim 29, wherein said blurring further comprises anti-aliasing one or more edge pixels that correspond to the plurality of pixels of the background image, wherein the one or more edge pixels are within a specified pixel distance of pixels corresponding to an edge of the foreground image.

* * * * *